(12) United States Patent
Wigger et al.

(10) Patent No.: US 11,166,160 B1
(45) Date of Patent: *Nov. 2, 2021

(54) ALERTING ON CONTRABAND DEVICE DETECTION

(71) Applicant: Securus Technologies, Inc., Carrollton, TX (US)

(72) Inventors: Daniel James Wigger, Prosper, TX (US); Amir Ameli Gonabadi Nezhad, McKinney, TX (US); Mark Baker, Palm Bay, FL (US); John Wange, Dallas, TX (US); Christopher Douglas, McKinney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 147 days.

This patent is subject to a terminal disclaimer.

(21) Appl. No.: 16/032,831

(22) Filed: Jul. 11, 2018

(51) Int. Cl.
| | |
|---|---|
| *H04L 29/06* | (2006.01) |
| *H04W 12/08* | (2021.01) |
| *H04W 12/12* | (2021.01) |
| *G08B 7/06* | (2006.01) |
| *H04W 4/33* | (2018.01) |
| *H04W 48/02* | (2009.01) |
| *H04L 12/58* | (2006.01) |

(52) U.S. Cl.
CPC .............. *H04W 12/08* (2013.01); *G08B 7/06* (2013.01); *H04L 51/24* (2013.01); *H04W 4/33* (2018.02); *H04W 12/12* (2013.01); *H04W 48/02* (2013.01)

(58) Field of Classification Search
CPC .... H04L 63/1408; H04L 51/24; H04W 12/12; H04W 12/08

USPC .......................................................... 726/26
See application file for complete search history.

(56) References Cited

U.S. PATENT DOCUMENTS

| | | | |
|---|---|---|---|
| 7,102,509 B1 | 9/2006 | Anders et al. | |
| 10,027,797 B1 | 7/2018 | Hodge et al. | |
| 2012/0054276 A1 | 3/2012 | Chaturvedi et al. | |
| 2014/0194084 A1 | 7/2014 | Noonan et al. | |
| 2017/0094534 A1* | 3/2017 | Salyers | H04W 12/06 |
| 2018/0062784 A1 | 3/2018 | Hodge | |
| 2019/0035242 A1* | 1/2019 | Vazirani | G08B 29/188 |

* cited by examiner

*Primary Examiner* — Longbit Chai
(74) *Attorney, Agent, or Firm* — Fogarty LLP

(57) ABSTRACT

A system for contraband device identification and alerting is disclosed. The system comprises a wireless signal detection system configured to identify signals from an unauthorized wireless device, and an alert module configured to generate notifications when an unauthorized wireless device is detected. The unauthorized wireless device is operating within a designated or controlled area. The designated area may overlap a controlled-environment facility and the wireless device is contraband within the controlled-environment facility. The alerting system may include a speaker, wherein the notifications comprise an audible message broadcast via the speaker. The alerting system may include one or more lights, wherein the notifications comprise illuminating the light. The notifications may also comprise one or more of a call, email, audible or visual alert, vibration and text that are sent to a designated individual. The alerting system may also shutdown, lockdown, or lockout the facility an unauthorized device is detected.

18 Claims, 4 Drawing Sheets ional institution context, the staff of a
ALERTING ON CONTRABAND DEVICE DETECTION

BACKGROUND

Correctional facilities, such as prisons and jails, usually allow residents (i.e., inmates) to communicate with family, friends, attorneys, and others outside the facility to allow the residents to maintain personal connections and to facilitate their transition back into society upon release. Most controlled-environment facilities allow some form of telephone calls, in-person visitation, video visitation, etc. for such communication.

However, correctional facilities prohibit residents from engaging in unauthorized communications with individuals outside of the facility. In most correctional facilities, unauthorized cell phones, smartphones, cellular-enabled smartwatch or tablets, and other mobile communications devices that allow a resident to circumvent the approved facility communication systems are considered contraband. Use of contraband communications devices within a controlled-environment facility may pose a security risk and may allow for continued criminal activity by the residents. Possession of a contraband communications device is considered a violation of facility rules and such devices are confiscated by the facility staff when found.

Authorities operating the controlled-environment facility often try to identify and block unauthorized use of contraband communications equipment. Existing methods for detecting and/or controlling access to contraband communications equipment include, for example, jamming frequencies used for cell phone communications and use of mobile detection equipment (e.g., "wands"). These methods have drawbacks. For example, jamming communication frequencies is illegal in the United States and disrupts authorized communications, and mobile detection equipment may not detect when a contraband device is powered off.

SUMMARY

The present invention is directed to contraband device identification and alerting. In an example embodiment, an alerting system comprises a wireless signal detection system configured to identify signals from an unauthorized wireless device, and an alert module configured to generate notifications when an unauthorized wireless device is detected. The unauthorized wireless device is operating within a designated or controlled area. The designated area may overlap a controlled-environment facility and the wireless device is contraband within the controlled-environment facility.

The wireless device detection system may comprise a managed access system that is adapted to appear as an operating network to unauthorized wireless devices operating within a designated area. The managed access system may prevent unauthorized wireless devices from communicating with other networks. The managed access system can be adapted to appear as a cellular network or a wireless local area network.

The alerting system may include a speaker, wherein the notifications comprise an audible message broadcast via the speaker. The alerting system may include one or more lights, wherein the notifications comprise illuminating the light. The notifications may also comprise one or more of a call, email, audible or visual alert, and text that are sent to a designated individual.

In another embodiment, a method, comprises monitoring designated frequencies to identify signals from an unauthorized wireless device that is operating within a controlled area, and generating an alert when an unauthorized wireless device is detected within a controlled area. Additionally, an automated function, such as a lockdown, lockout, blackout, or shutdown, may be triggered when an unauthorized wireless device is detected within the controlled area. The monitoring can be performed by a managed access system that is adapted to appear as a valid operating network to unauthorized wireless devices operating within the controlled area. The managed access system may prevent unauthorized wireless devices from communicating with other networks.

The method may comprise broadcasting the alert via a speaker and/or lighting one or more lights in response to the alert. The alerts may also comprise one or more of a call, email, vibration, audible or visual alert, and text that are sent to a designated individual. The alert may be provided locally or to a remote off premise facility.

BRIEF DESCRIPTION OF THE DRAWINGS

Figure 1:
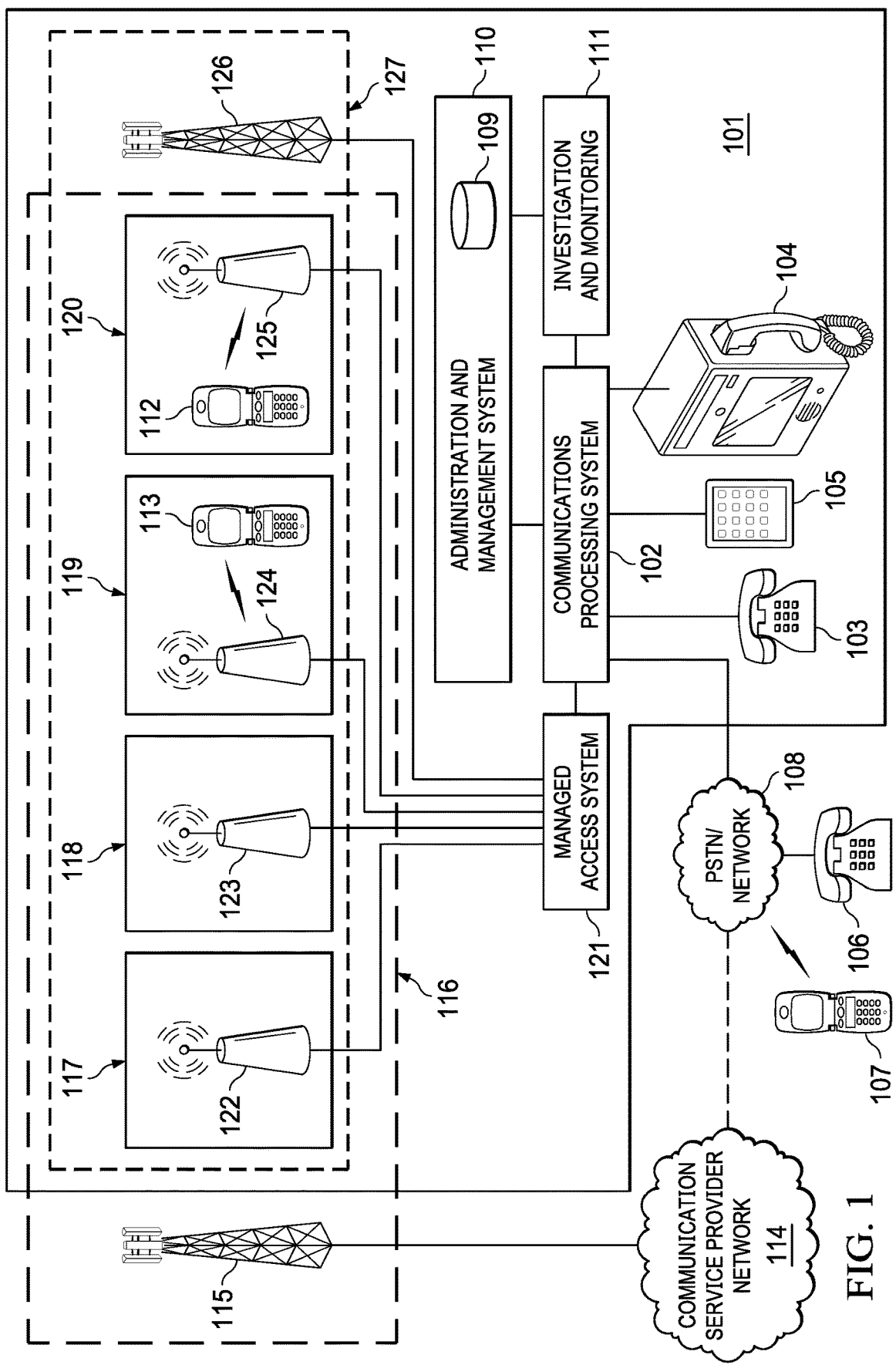

Having thus described the invention in general terms, reference will now be made to the accompanying drawings, which are not necessarily drawn to scale, and wherein:

FIG. 1 is a high-level block diagram of a controlled-environment facility having systems and methods for detecting contraband wireless communications devices and issuing alerts according to an example embodiment.

Figure 2:
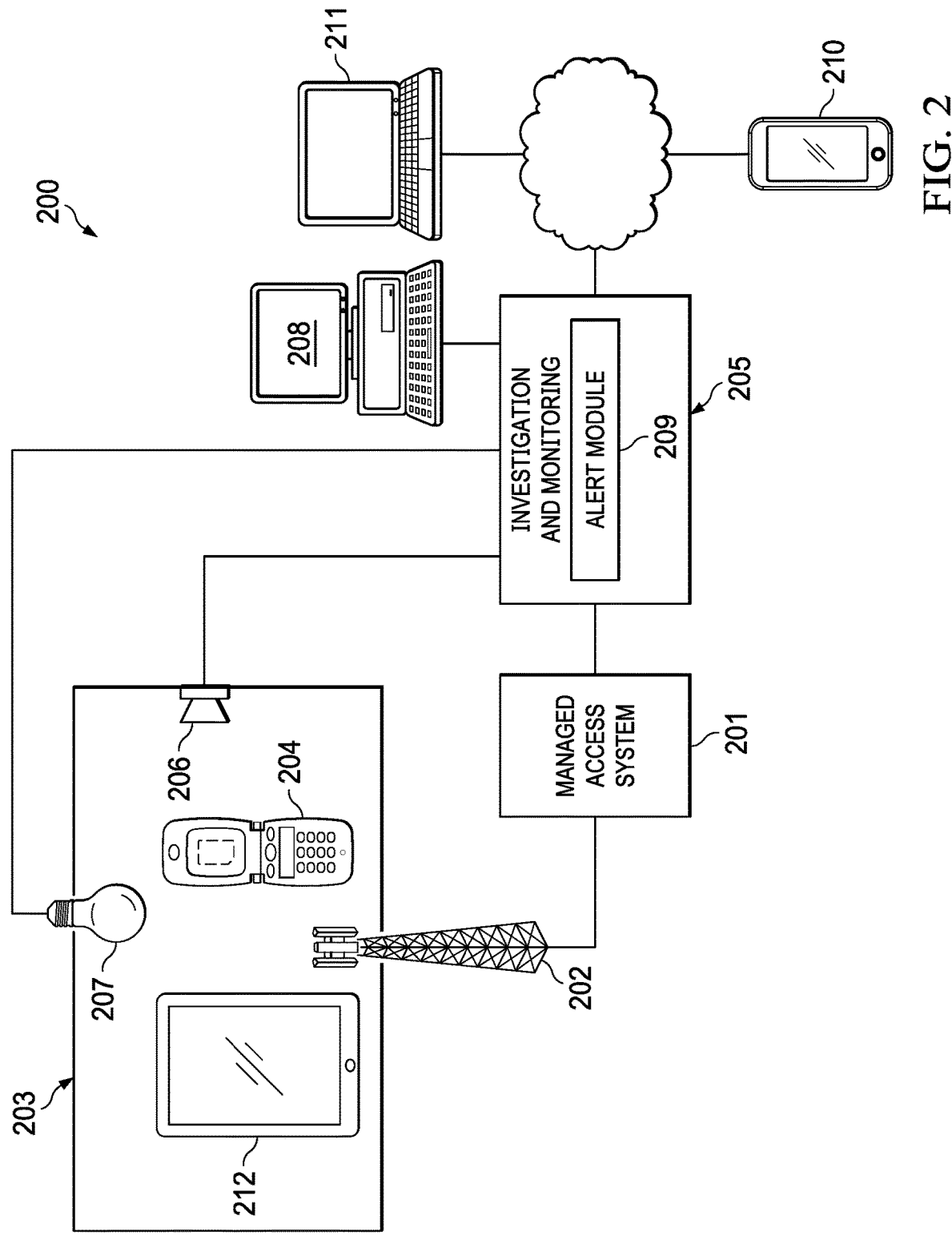

FIG. 2 is a block diagram illustrating an example system 200 for detecting wireless devices in a restricted area and for alerting investigators.

Figure 3:
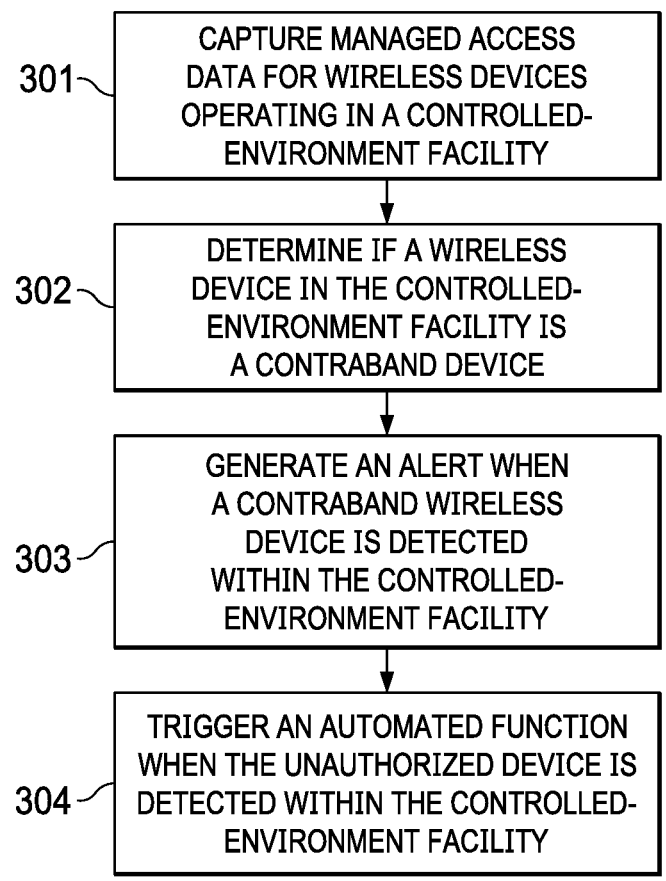

FIG. 3 is an example process for detecting contraband wireless communications devices and issuing alerts.

Figure 4:
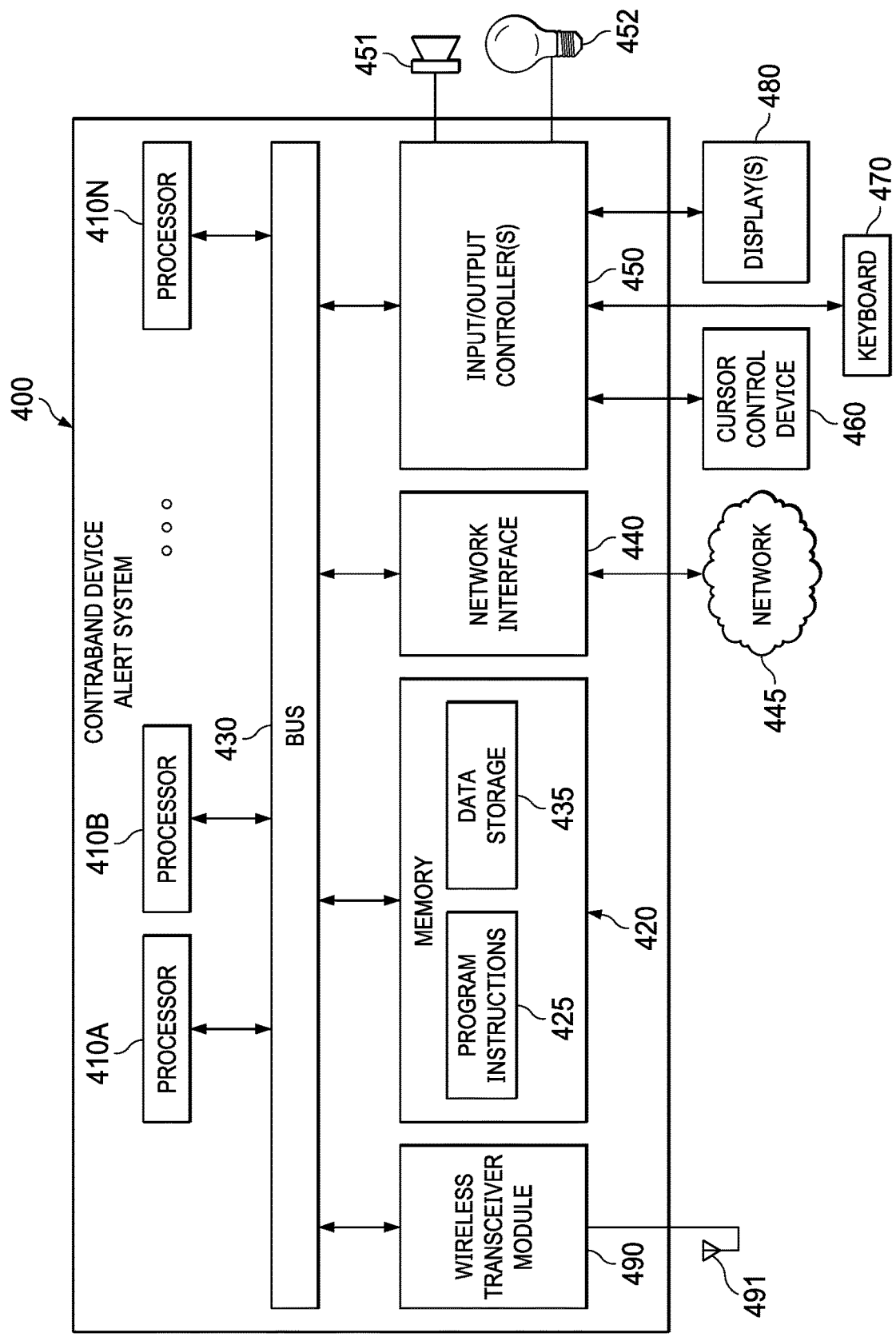

FIG. 4 is a block diagram illustrating a contraband wireless device alert system according to another embodiment.

While this specification provides several embodiments and illustrative drawings, a person of ordinary skill in the art will recognize that the present specification is not limited only to the embodiments or drawings described. The drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates generally to controlled-environment facilities and, more specifically, to identifying contraband wireless communications devices. In the law enforcement/correctional institution context, the staff of a controlled-environment facility needs to detect contraband cell phones and other communication devices to prevent unauthorized communications by residents, which often involve illegal activity. Controlled-environment facility residents obtain access to contraband devices through many different sources, such as visiting family and friends or even facility staff. Residents use the contraband communications devices to circumvent the facility's communication systems, which would otherwise limit who the resident could call and would usually allow for monitoring and/or recording of resident calls. During their communications, inmates may make incriminating admissions, commit further criminal acts, conspire to commit further criminal acts, or leave a trail of incriminating data. By circumventing the facility communication system, however, it may not be possible to monitor and detect such activities.

In the context of healthcare facilities, educational environments, or restricted living quarters, the medical staff or teachers may want to limit patient or student use of unauthorized or unmonitored communications to maintain a treatment plan or to control an academic environment. It will be understood that the systems and methods disclosed herein may be used with any long-standing, new, fixed, or temporary facility or location. Moreover, the unauthorized communications may be initiated by users that are present at the facility for any duration whether permanent, temporary, transient, long term, or short term. The users may be confined to the facility or may be free to come and go as they please. The users may be known or unknown to the facility staff. For example, the systems and methods disclosed herein may be used to detect unauthorized communications by attendees at a concert venue, fans at a sports stadium, participants in a conference or forum, or attendees at a parade, fair, festival, demonstration, rally, or celebration.

FIG. 1 is a high-level block diagram of a controlled-environment facility 101 having systems and methods for detecting contraband wireless communications devices and issuing alerts according to an example embodiment. A communications processing system 102 provides communications for controlled-environment facility 101. This may include, for example, telephone services, videoconferencing, online chat, text/SMS messaging, and other forms of communications between residents and/or staff of controlled-environment facility 101 and individuals located outside the facility. In some embodiments, communications processing system 102 may be co-located with controlled-environment facility 101, as illustrated. Alternatively, communications processing system 102 may be centrally or remotely located with respect to one or more controlled-environment facilities and may provide communication services to multiple controlled-environment facilities. More generally, it should be noted that communications processing system 102 may assume a variety of forms, and may be configured to serve a variety of facilities and/or users, whether within or outside of a controlled-environment facility.

Residents access communication services using telephones 103, video visitation or Intelligent Facility Devices (IFD) 104, and/or tablet devices 105 that are adapted and approved for use in controlled-environment facility 101. Device 104 may be, for example, a specialized video conferencing terminal, kiosk, or workstation, such as a processor-based self-service kiosk user terminal configured to communicate with an information management system to facilitate self-service acquisition of correctional facility information and services by a user thereof. For example, a resident initiating an approved telephone call may lift the receiver on telephone 103 or IFD 104 or may launch a communication application program on device 105. The resident may then be prompted to provide a personal identification number (PIN), other identifying information or biometrics.

Under the control of communication processing system 102, devices 103, 104 and 105 may connect to an outside telephone 106, wireless device 107, or other communication device via network 108. Telephone 106 and/or wireless device 107 may belong to a non-resident (e.g., any person not confined to the controlled-environment facility) or a staff member of the controlled-environment facility. The non-resident device may be accessed using any network 108, such as a publicly switched telephone network (PSTN), an Integrated Services Digital Network (ISDN), Voice-over-IP (VoIP) network, or packet data network, such as, the Internet.

In addition to providing certain communication and visitation operations, communication processing system 102 typically ensures that the residents' calls, video conferences, online chats, text messages, etc. are connected only to non-residents whose identities, devices, email addresses, phone numbers, etc. are listed in that resident's pre-approved contact (PAC) or personal allowed numbers (PAN) list. The PAC/PAN may be a whitelist or a blacklist that identifies contacts that are allowed or restricted for the resident. Each resident's PAN list may be stored, for example, in a database 109 that is maintained by an administration and management system (AMS) 110, a jail management system (JMS), or the like. In addition to PAN lists, AMS 110 may also store inmate or resident profile data (RPD), such as balances for inmate trust and calling accounts, trial schedule, conviction data, criminal record, sentencing data, time served, time remaining to be served, release date, cell and cellmate assignments, resident restrictions and warnings, commissary order history, telephone call history, call recordings, known or suspected gang or criminal affiliations, known or suspected affiliates or accomplices, and any other information that may be relevant or useful to correctional facility staff. In scenarios where communication system 102 is located within the controlled-environment facility 101, it may have direct access to AMS 110. In other embodiments, however, communication system 102 may also be located remotely from the controlled-environment facility 101 and access to AMS 110 may be accomplished via a computer network such as, for example, network 108.

In some embodiments, communication system 102 is configured to monitor and/or record the residents' telephone and/or video visitations. An investigation and monitoring module 111 may record all or some resident communications. The content of other communications, such as texts, chat sessions, and emails, may also be captured and monitored. The communications may be monitored in real-time by an investigator or automatically monitored to detect the use of selected keywords, for example. The content and metadata associated with the residents' communications may be recorded and stored for later analysis, review, or investigation.

Most controlled-environment facilities restrict or prevent residents from communicating with persons outside of the facility using any unapproved device, such as the system described above (i.e., communication processing system 102, and devices 103, 104 or 105). Administrators of the controlled-environment facility may wish to limit the residents' contact to individuals on the resident's PAN list, for example. This protects people outside the controlled-environment facility from offensive, inappropriate, or illegal contact with a resident. Additionally, these restrictions prevent residents from directing further illegal activity with conspirators located outside of the controlled-environment facility. By limiting the communication by residents, the facility also ensures monitoring of residents' communications. Nonetheless, residents often find ways of bypassing the approved communication system. For example, contraband wireless devices 112, 113 are often smuggled into controlled-environment facilities.

Contraband wireless devices 112, 113 allow residents to bypass communication processing system 102 and instead establish communication with others using a third-party cellular service provider's network 114, such as any of the well-known and widely available global cellular providers. One or more antenna 115 provide communications service in an area or cell 116 overlapping some or all of controlled-environment facility 101. When the contraband wireless devices 112, 113 are turned on, they connect to communication service provider's network 114 via antenna 115, which allows for a resident's communications to be routed directly to network 114. This allows residents with contraband wireless devices 112, 113 to contact telephone 106 or wireless device 107 (e.g., tablets, personal computers, smartphones) directly without any monitoring or control by communication processing system 102.

Controlled-environment facility 101 comprises several resident housing units 117-119, which may be referred to as pods, sections, units, dormitories, or blocks, for example. These housing units may be distributed across different buildings, wings, or floors of controlled-environment facility 101. Controlled-environment facility 101 also comprises various common spaces 120, such as dining halls, recreation areas, medical facilities, etc. In some controlled-environment facilities, a wireless containment solution (WCS) or managed access system (MAS) 121 may be used to intercept and manage communications initiated from contraband communications devices 112, 113. The managed access system 121 may employ one or more access points 122-125 as part of a distributed antenna system or other wireless distribution system. In one embodiment, access points 122-125 may be antennas that function as microcells or picocells that provide coverage for mobile communication service over limited areas. For example, a dedicated access point 122 may be placed within housing unit 117 so that all wireless communications devices within housing unit 117, including any contraband communications devices, will identify access point 122 as the primary provider of communication services. Other dedicated access points 123-125 may be placed within housing units 118, 119 and common area 120 so that all wireless communications devices within those areas will identify the respective access point as the primary provider for communications. Alternatively, a single antenna 126 or multiple antennas for managed access system 121 may service an area or cell 127 overlapping some or all of controlled-environment facility 101.

In certain embodiments, the power levels associated with access points 122-125 may be adjusted such that the geographical area of the wireless communications coverage corresponds generally to the respective housing unit 117-119 or common area 120. Thus, all communications originating from within a particular housing unit 117-119 or common area 120 are directed through managed access system 121 through a specific wireless access point 122-125 that is associated with that unit or area. Each access point's power may be configured so that wireless devices within a particular unit will register with a specific access point and not with an access point in a neighboring unit or with a third-party service provider's antenna 115. This allows managed access system 121 to control whether radio resources and communication traffic channels are assigned when wireless devices within each unit or area of controlled-environment facility 101 attempt to initiate a communication connection.

By controlling any communication initiation, managed access system 121 can control and manage communications within controlled-environment facility 101. Communications initiated by, or directed to, contraband communications devices 112, 113 can be blocked without impacting legitimate wireless communications, such as calls from the facility staffs' wireless devices or from approved communications devices 105. Additionally, managed access system 121 can be configured to allow communications from only within designated areas and/or devices of the controlled-environment facility 101.

Managed access system 121 and associated access points 122-125 and/or antenna (s) 126 may be a combination of a wireless network and a tightly controlled distributed antenna system. Managed access system 121 may employ any 2G, 3G, 4G and/or 5G technologies and other protocols that are used by wireless service providers. Almost all mobile phones use cellular technology, such as Global System for Mobile Communications (GSM) or code-division multiple access (CDMA) technology. However, it will be understood that the managed access system 121 disclosed herein can be used with any current, legacy, or future cellular technology or protocols, such as GSM, General Packet Radio Service (GPRS), cdmaOne, CDMA2000, Evolution-Data Optimized (EV-DO), Enhanced Data Rates for GSM Evolution (EDGE), Long Term Evolution (LTE), Universal Mobile Telecommunications System (UMTS), Digital Enhanced Cordless Telecommunications (DECT), and Digital AMPS (IS-136/TDMA). The term "contraband communications devices" as used herein may refer to any unauthorized cellular telephone, mobile telephone, smartphone, cellular-enabled smartwatch, tablet computer, portable personal computer wireless or cellular modem, whether it be foreign or domestic, or other device that supports wireless communication.

In some embodiments, managed access system 121 may capture identifying data from contraband communications devices 112, 113, such as an International Mobile Equipment Identifier (IMEI), Mobile Subscriber Integrated services Digital Network Number (MSIDN), Mobile Equipment IDentifier (MEID), Equipment Serial Numbers (ESN), International Mobile Subscriber Identity (IMSI), or Temporary Mobile Subscriber Identity (TMSI) assigned to the device, dialed telephone numbers, message addresses, and the like. This identifying data can be used, for example, to correlate information captured across several communication sessions or attempts. The identifying data may also be used to identify a specific device and possibly to identify where the device was purchased, and by whom, to identify the source of contraband communications devices 112, 113. Such identifying data may be captured by the managed access system 121 even if the device itself is not found during a search.

Managed access system 121 may apply policy rules as determined by controlled-environment facility administrators, which may be enforced by AMS 110 via communications processing system 102. The policy rules as applied to contraband communications devices 112, 113 may, for example, allow calls, messages, or data to be connected to called parties, require blocking calls or messaging attempts, allow for monitoring of call, message, or data content, and/or recording of calls, messaging, or data communication content. The policy rules may be applied in different ways across controlled-environment facility 101 so that communications initiated by contraband communications devices 112, 113 within different housing units or common areas are treated in a different way depending upon a device's location. For example, calls may be allowed, monitored, and recorded for devices in housing unit 117, but blocked in housing units 118, 119 and common area 120.

Managed access system 121 and associated access points 122-125 and/or antenna(s) 126 may provide various levels of functionality in different embodiments. For example, managed access system 121 may provide live communications service and allow contraband devices 112, 113 to communicate with outside PSTN/network 108. This would allow investigators to monitor and/or record communications between residents of the controlled-environment facility and outside parties and to identify which devices 106, 107 are contacted by the residents. In other embodiments, managed access system 121 may cause contraband communications devices 112, 113 to function as if connected to a live network but not actually complete attempted communications, such as by generating a busy signal. This may cause the resident to attempt further communications using contraband communications devices 112, 113 and thereby unknowingly provide additional information to investigators.

In another embodiment, access points 122-125 and/or antenna(s) 126 may simply function as detectors that sense when a communications device is being used within a known or limited area, such as a housing unit 117-119, common area 120, or service area or cell 127. Upon detection of signals from a communications device at access points 122-125 and/or antenna(s) 126, managed access system 121 may notify an investigator or facility staff via investigation and monitoring module 111 so that further action may be taken.

FIG. 2 is a block diagram illustrating an example system 200 for detecting wireless devices in a restricted area and for alerting investigators and/or facility staff. Investigators may include correctional officials, law enforcement agents, criminal investigators, detectives, or any like party or agency representative. Managed access system 201 uses one or more access points or antennas 202 to provide wireless coverage in a designated area 203, such as a cell, housing unit, common area, hallway, classroom, etc. In one embodiment, managed access system 201 functions as a cellular network. Any wireless device within designated area 203 will attempt to register with managed access system 201 as if the network belonged to a commercial wireless service provider. For example, when a contraband wireless device 204 is turned on or enters into the coverage area 203, it may attempt an attach procedure with managed access system 201 via antenna 202 as defined by 3GPP/LTE standards. Managed access system 201 may emulate the operations of a commercial service provider network and respond to requests and messages from contraband wireless device 204 as if executing a normal attach, authentication, and/or context setup function. Alternatively, managed access system 201 may detect an attach request and notify investigation and monitoring module 205 without following the normal attach procedure. In other embodiments, managed access system 201 and antenna 202 does not need to identify a specific type of wireless message, such as the attach message, but may simply monitor known or expected cellular and/or wireless network frequencies (e.g., the 850 MHz cellular band, 1900 MHz PCS band, etc.) licensed or unlicensed to detect the operation of a contraband wireless device 204 without regard to the specific operations or communications attempted by contraband wireless device 204.

When communications are attempted or detected by managed access system 201, a notification is sent to investigation and monitoring module 205, which may take further action such as broadcasting an alert at location 203 and/or alerting an investigator. Investigation and monitoring module 205 may take specified actions based upon the location 203, device 204, date, time, attempted operation, destination address, or other data observed or detected.

An audible alert tone or message may be broadcast using speaker 206 at location 203 when a contraband wireless device 204 is detected. The tone or message may provide a covert or overt indication to facility staff or investigators that a contraband device is in the area. A covert indication may take the form, for example, of an innocuous tone, signal, or phrase that is broadcast by speaker 206, such as a low-volume or soft pinging or buzz or an irrelevant spoken message (e.g., "Mr. Smith call the office"). Facility staff would be pre-briefed and trained that the covert alert sound indicates that a contraband wireless device has been detected in location 203 and that a search should be initiated. However, residents would likely ignore such sounds and would continue to use contraband wireless device 204, which would increase the chances that facility staff find the contraband wireless device 204 before it can be hidden.

Alternatively, an overt audio indication may take the form of a loud tone, siren, or warning message that is broadcast by speaker 206. Such an overt message would indicate that a contraband wireless device has been detected in location 203 and that a search should be initiated, but would also likely notify the residents of that a device was detected. The volume and/or frequency of the loud tone or noise may be selected to provide maximum interference with the microphone of a typical contraband wireless device 204 to minimize the amount of speech that can be sent by the resident using the device. The audible tone may be used as a nuisance to the residents in the controlled environment facility.

Similarly, a light 207 may be illuminated at location 203 when a contraband wireless device 204 is detected. The light 207 may provide a covert or overt indication to facility staff or investigators that a contraband device is in the area. A covert indication may be accomplished by lighting a single bulb or light fixture that has no apparent meaning other than illumination in area 203. For example, a typical ceiling light fixture that is usually off (e.g., as if unneeded, or burned out) may be illuminated upon detection of contraband wireless device 204 as a covert signal to facility staff. In another embodiment, an illuminated sign may be used to provide an alert instead of a light bulb or light fixture. Facility staff would know that illumination of light 207 indicates that a contraband wireless device has been detected in location 203 and that a search should be initiated. However, residents would likely ignore such a signal and would continue to use contraband wireless device 204, which would increase the chances that facility staff find the contraband wireless device 204 before it can be hidden.

Alternatively, an overt indication may take the form of one or more bright, flashing lights 207 or a sign with an explicit warning message. Such a signal from light 207 would indicate that a contraband wireless device has been detected in location 203 and that a search should be initiated, but would also likely notify the residents that a device was detected.

In other embodiments, instead of broadcasting a sound or illuminating a light to indicate detection of contraband wireless device 204, a sound that is normally present (e.g., background music, or television audio) or a light that is normally on (e.g., a ceiling fixture or sign) may be turned off as an indication that a device 204 was detected.

In further embodiments, other events may be triggered in location 203 when a contraband wireless device 204 is detected. For example, doors to location 203 may be locked to create a lockdown situation so that the contraband wireless device 204 cannot be moved. Utility services, such as plumbing, electrical, or television service, may be disrupted at location 203 when a contraband wireless device 204 is detected to give facility staff an excuse to visit the location (e.g., ostensibly visiting for repairs) so that a search can be conducted.

The alert, such as a sound, light, or other indication, that is triggered when contraband wireless device 204 is detected may continue until manually shut off by facility staff or may be configured to automatically end after a predetermined duration. The alert can be triggered as soon as contraband wireless device 204 is detected and may continue whether or not the contraband wireless device 204 can still be detected (e.g., continues to attempt wireless communications). Alternatively, the alert may be terminated if the contraband wireless device 204 is no longer detected.

An investigator or facility staff may access investigation and monitoring module 205, such as using terminal 208 or other user interface (e.g., 210 or 211), to configure desired alerts. The user interface may allow the user or investigator to specify particular actions (i.e., sounds or lights) to be triggered when a contraband wireless device 204 is detected. In one embodiment, an alert module 209 stores an alert list. When a contraband wireless device 204 is detected, then alert module 209 will automatically take the designated action. Investigation and monitoring module 205 and alert module 209 may serve a number of different locations 203 and may provide different alerts in different locations 203. Alert module 209 may be configured to contact an investigator on a local or networked terminal 208 or at a remote terminal 210 or email address 211. For example, the investigator or group of investigators may want to be notified by email, text, or page if a device 204 is detected.

Because the managed access system 201 and investigation and monitoring module 205 is operating in real-time to detect contraband wireless device 204, the alert is automatically and immediately initiated when a detection event occurs. This allows the investigator or facility staff to take further action, such as initiating an immediate search or lock-down of a facility to find the contraband device 204.

Managed access system 201 is not limited to detecting wireless telephone activity. In other embodiments, managed access system 201 and antenna 202 may be configured to support any radio frequency (RF) interface for a wireless local area network (WLAN), such as connections based on Wi-Fi, Bluetooth, ZigBee, WiMAX, Near-field communication (NFC), or other communication protocols or standards. For example, a Wi-Fi enabled device 212 may attempt to access a wireless network but instead attaches to a Wi-Fi network being emulated by managed access system 201. Device 212 may be identified, for example, by an IMSI, IMEI, IP or MAC address. Any activity by device 212, such as messages sent or web site connections attempted, may be logged by investigation and monitoring module 205 and may trigger notifications, such as lights or sounds, by alert module 209.

As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents.

FIG. 3 is an example process 300 for detecting contraband wireless communications devices and issuing alerts that may, but need not, be implemented using the architecture shown in FIGS. 1 and 2. The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

In step 301, managed access data is captured from wireless devices operating in a controlled-environment facility. A managed access system is adapted to appear as an operating network to wireless devices within a designated area. The managed access system is further adapted to prevent connected wireless devices from communicating with other networks. The designated area overlaps the controlled-environment facility and the wireless devices are not authorized and/or allowed in the controlled-environment facility. The managed access system may be adapted to appear as a cellular network or a wireless local area network.

In step 302, the system determines if a wireless device in the controlled-environment facility is a contraband device. A device may be identified as contraband based solely upon its presence if the controlled-environment facility does not allow any wireless devices. Alternatively, additional data analysis, such as evaluating the device identifiers, called numbers, or other parameters, may be required to determine if a device is contraband or allowed.

In step 303, an alert is generated when a contraband wireless device is detected within the controlled area. The alert may be an audio tone or message or another signal, such as a light.

In step 304, an automated function is triggered when the unauthorized wireless device is detected within the controlled area. The automated function may be, for example, a lockdown, a lockout, a blackout, and/or a security shutdown. These functions may create physical barrier to prevent entering or exiting and/or an electrical, data, or information barrier to prevent logon, deletion, reception, transmission, or other access. The physical and/or electrical barriers may be applied to an entire facility or to a subsection, such as a particular wing, cell, pod, housing unit, electrical or transmission lines, computer system, data storage, or the like.

Embodiments of the present systems and methods for contraband device identification and alert messaging, as described herein, may be implemented or executed, at least in part, by one or more computer systems. FIG. 4 is a block diagram illustrating a contraband wireless device alert system 400 according to another embodiment. In its simplest form, the contraband wireless device alert system 400 may be a single unit that monitors frequencies known to be used by contraband wireless devices and that emits an alert tone when activity is detected on such a frequency. The alert system 400 may be wall or ceiling mounted in a location of interest, such as a cell, pod, dorm, classroom, etc., similar to a smoke detector.

As illustrated, computer system 400 includes one or more processors 410A-N coupled to a system memory 420 via bus 430. Computer system 400 further includes a network interface 440 coupled to bus 430. Network interface 440 provides a connection to network 445, which may provide communication connections to other alert systems, investigation and monitoring systems, managed access systems, and the like. One or more I/O controllers 450 are coupled to peripheral devices, such as cursor control device 460, keyboard 470, display(s) 480, etc. Each of I/O devices 460, 470, 480 may be capable of communicating with I/O controllers 450, for example, via a wired connection (e.g., serial port, Universal Serial Bus port) or wireless connection (e.g., Wi-Fi, Bluetooth, Near Field Communications Link, etc.). I/O controller 450 provides a connection to speaker 451 and/or light 452, which can be used to create alerts when a contraband wireless device is detected. Other devices, such as microphones, antennas/wireless transducers, phone detection modules, etc., may be coupled to I/O controller 450.

Wireless transceiver module 490 uses antenna 491 to monitor frequencies used by wireless devices. For example, wireless transceiver module 490 may monitor frequencies assigned for use by cellular telephones or frequencies used by wireless local area networks, such as WiFi networks. When activity is detected on the monitored frequencies, wireless transceiver module 490 notifies a monitoring application running on processor 410, which may then trigger an alert sound, vibration or other signal. Wireless transceiver module 490 may be configured to send notifications only when detected signals are above a certain signal strength to ensure that the detected device is close by and likely within a monitored location. This would minimize false alarms that might be triggered by signals from devices outside the monitored location. Wireless transceiver module 490 may be further configured to send notifications only when certain messages or activity are detected on the monitored frequencies, such as cellular attachment requests or WiFi probe requests. Wireless transceiver module 490 may be configured to only monitor and receive signals but may also be configured in other embodiments to transmit so that two-way communication connections can be established with contraband wireless devices.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or another dedicated graphics-rendering device.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 420 as program instructions 425 and data storage 435, respectively. In other embodiments, program instructions and/or data may be received, sent, or stored upon different types of computer-accessible media or on similar media separate from system memory 420 or computer system 400.

A computer-accessible medium may include any tangible and/or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, wireless transcriber module 490, and any peripheral devices in the computer system, including network interface 440 or other peripheral interfaces, such as I/O devices 460, 470, 480. In some embodiments, bus 430 may perform any necessary protocol, timing, or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 450 may, in some embodiments, enable communications with one or more display terminals, keyboards, keypads, touchpads, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440.

As shown in FIG. 4, system memory 420 may include program instructions 425, configured to implement certain embodiments described herein, and data storage 435, comprising various data may be accessible by program instructions 425. In an embodiment, program instructions 425 may include software elements, which may be configured to affect the operations discussed in FIGS. 1 through 3. Program instructions 425 may be implemented in various embodiments using any desired programming language, scripting language, or combination of programming languages and/or scripting languages (e.g., C, C++, C #, Java™, JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

A person of ordinary skill in the art will appreciate that computer system 400 is merely illustrative and is not intended to limit the scope of the disclosure described herein. The computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

What is claimed is:

1. A system for alerting on contraband device detection, comprising:
   a managed access system comprising one or more hardware processors adapted to provide access to an operating network for wireless devices operating within a designated area through at least one access point placed within a controlled-environment facility, the managed access system configured to identify signals from an unauthorized wireless device that is operated by an unauthorized user and to permit at least one unauthorized wireless device to complete an unauthorized communication operated by the unauthorized user with a device operating outside the controlled-environment facility, wherein the unauthorized communication is permitted based on the location of the unauthorized wireless device, wherein the designated area overlaps a controlled-environment facility and the unauthorized wireless device is contraband within the controlled-environment facility; and
   an alert module configured to generate notifications in the designated area when an unauthorized wireless device is detected.

2. The system of claim 1, wherein the managed access system is further adapted to prevent unauthorized wireless devices from communicating with other networks.

3. The system of claim 1, further comprising:
a speaker, and wherein the notifications comprise an audible message broadcast via the speaker.

4. The system of claim 1, further comprising:
one or more lights, wherein the notifications comprise illuminating the light.

5. The system of claim 1, wherein the notifications comprise one or more of a call, email, audible or visual alert, vibration, and text that are sent to a designated individual.

6. The system of claim 1, wherein the operating network is a cellular network.

7. The system of claim 1, wherein the operating network is a wireless local area network.

8. The system of claim 1, wherein the notification is a covert audible or visual alert to staff in the designated area.

9. A method for alerting on contraband device detection, comprising:
monitoring designated frequencies to identify signals from an unauthorized wireless device that is operated by an unauthorized user and that is operating within a controlled area, wherein the monitoring is performed by a managed access system that is configured to be a valid operating network to wireless devices operating within the controlled area, wherein the controlled area overlaps a controlled-environment facility and the unauthorized wireless device is contraband within the controlled-environment facility;
permitting at least one unauthorized wireless device operated by the unauthorized user to complete an attempted communication with a device operating outside the controlled-environment facility, wherein the attempted communication is permitted based on the location of the unauthorized wireless device; and
generating an alert in a controlled area when the unauthorized wireless device is detected within the controlled area.

10. The method of claim 9, wherein the managed access system is further adapted to prevent unauthorized wireless devices from communicating with other networks.

11. The method of claim 9, wherein the alerts comprise one or more of a call, email, audible or visual alert, vibration, and text that are sent to a designated individual.

12. The method of claim 9, wherein the operating network is a cellular network.

13. The method of claim 9, wherein the operating network is a wireless local area network.

14. The method of claim 9, further comprising:
triggering an automated function when the unauthorized wireless device is detected within the controlled area.

15. The method of claim 14, wherein the automated function comprises one or more of: a lockdown, a lockout, a blackout, and a security shutdown of a wing, cell, pod, facility, or housing unit.

16. The method of claim 9, wherein the alert is a covert message to staff in the controlled area.

17. The method of claim 16, further comprising:
broadcasting the alert via a speaker.

18. The method of claim 16, further comprising:
lighting one or more lights in response to the alert.

* * * * *